(12) United States Patent
Witte

(10) Patent No.: US 6,805,339 B2
(45) Date of Patent: Oct. 19, 2004

(54) SANDWICH BOARD FOR ERECTING CLAMPING DEVICES FOR WORKPIECES

(75) Inventor: Horst Witte, Nahrendorf (DE)

(73) Assignee: Horst Witte Entwicklungs- und Vertriebs-KG, Nahrendorf (DE)

( * ) Notice: Subject to any disclaimer, the term of this patent is extended or adjusted under 35 U.S.C. 154(b) by 0 days.

(21) Appl. No.: 10/359,433

(22) Filed: Feb. 6, 2003

(65) Prior Publication Data

US 2003/0151186 A1 Aug. 14, 2003

(30) Foreign Application Priority Data

Feb. 13, 2002 (DE) ...................................... 202 02 108 U

(51) Int. Cl.⁷ .............................................. B23K 11/00
(52) U.S. Cl. ..................... 269/289 R; 269/45; 269/900; 269/286
(58) Field of Search ........................ 269/900, 45, 302.1, 269/289 R, 286; 211/41.1, 60.1, 62, 68

(56) References Cited

U.S. PATENT DOCUMENTS

| | | | | |
|---|---|---|---|---|
| 3,638,934 A | * | 2/1972 | Blum et al. ................. | 269/900 |
| 3,884,473 A | * | 5/1975 | Pritulsky .................... | 273/255 |
| 4,886,257 A | | 12/1989 | Witte | |
| 5,773,783 A | | 6/1998 | Bowerman | |
| 6,051,325 A | | 4/2000 | Talwar et al. | |
| 6,132,684 A | * | 10/2000 | Marino ........................ | 211/74 |
| 6,142,323 A | * | 11/2000 | Veil et al. ..................... | 211/40 |
| 6,375,177 B1 | * | 4/2002 | Witte .......................... | 269/45 |

FOREIGN PATENT DOCUMENTS

EP 0797043 9/1997

* cited by examiner

Primary Examiner—Robert C. Watson
(74) Attorney, Agent, or Firm—Friedrich Kueffner

(57) ABSTRACT

A sandwich board for erecting workpiece clamping devices has an upper plate forming a clamping surface provided with fastening bores and a lower plate forming a support surface. Support bodies are positioned between the upper plate and the lower plate. The support bodies are pin-shaped and are friction-welded to a first one of the upper and lower plates and glued to a second one of the upper and lower plates.

5 Claims, 2 Drawing Sheets

SANDWICH BOARD FOR ERECTING CLAMPING DEVICES FOR WORKPIECES

BACKGROUND OF THE INVENTION

1. Field of the Invention

The invention relates to a sandwich board for erecting clamping devices for workpieces. The sandwich board comprises an upper plate forming the clamping surface provided with fastening bores, a lower plate forming a support surface, and support bodies arranged therebetween.

2. Description of the Related Art

Sandwich boards are monocoque construction components which are stiffened or reinforced across their entire surface and in all directions. They fulfill requirements with regard to uniform distribution of stresses, greatest possible shape stability, high and uniform strength against bulging and buckling while having a relatively low weight. The sandwich boards of the aforementioned kind are preferably used in connection with clamping systems for workpieces which serve for clamping and fixation of workpieces on machine tools and measuring devices.

Such a clamping system is known from European patent 0 222 147 B1. The sandwich board is particularly suitable for erecting such clamping systems. It can also provide the base plate for these known clamping systems. However, other fields of use are also conceivable, for example, their use as high performance transport pallets for such workpiece clamping systems.

European patent application 0 797 043 A2 describes a plate comprised of an aluminum alloy which consists of individual extruded profiles connected in a truss-type construction. The individual profiles are connected with one another by friction welding at the contact or joint locations. When performing friction welding, a special welding tool is used. The movement of the tool relative to the parts to be welded generates the required heat for welding or fusing.

SUMMARY OF THE INVENTION

It is an object of the present invention to provide a sandwich board of the aforementioned kind which is comprised preferably of aluminum or an aluminum alloy and which can be produced economically with high precision from standard material.

In accordance with the present invention, this is achieved in that the support bodies are formed as pegs or the like which are fastened by friction welding to one of the plates and are connected by gluing to the other plate.

According to the present intention, the known process of friction welding is used in order to connect the pegs, which may be pins, rods, bars, correspondingly configured connecting elements or spacers, by friction welding to one, preferably the upper one, of the plates. The process of friction welding which is used in this connection is carried out without a tool, i.e., at the location where the welding seam is to be generated, one workpiece is moved relative to the other workpiece causing friction and penetration into the material, wherein the material is transformed into a viscous or pasty state so that a permanent welding connection will result.

When a cylindrical peg is used, it is the workpiece which is rotated about its axis for generating the relative movement. With this type of friction welding a substantially smooth surface is produced on the exterior surface of the plate so that the generally required mechanical after machining is not needed. The welding seams are substantially not recognizable on the corresponding surface of the plates. Only minimal distortion at minimal heat penetration occurs. Materials of very different types can be welded to one another. Preferably, the workpiece clamping systems according to the invention, like the systems of the prior art, are made of aluminum and aluminum alloys.

The peg or pin or similarly configured support body can be configured in very different ways.

On the one hand, it is possible to essentially divide the pegs or pins into two parts or pin sections, wherein the two parts are then connected by friction welding to the correlated plate and the ends of the two parts facing one another are glued together. The glued connection is formed by a conical end of one part or pin section engaging a correspondingly shaped conical recess of the other part or pin section.

However, it is also possible to design the sandwich board such that the glued connection is formed by means of a sleeve friction-welded to the plate opposite the plate to which the peg or pin is connected by friction welding. The sleeve and the peg or pin are then glued together. Accordingly, the peg or pin is connected by friction welding to one of the plates and a sleeve is connected by friction welding to the other plate. The peg or pin engages the sleeve and is secured to the sleeve by gluing.

In the context of the present intention, many different support body or pin configurations and many different types of glued connections are conceivable.

DESCRIPTION OF THE PREFERRED EMBODIMENTS

Figure 1:
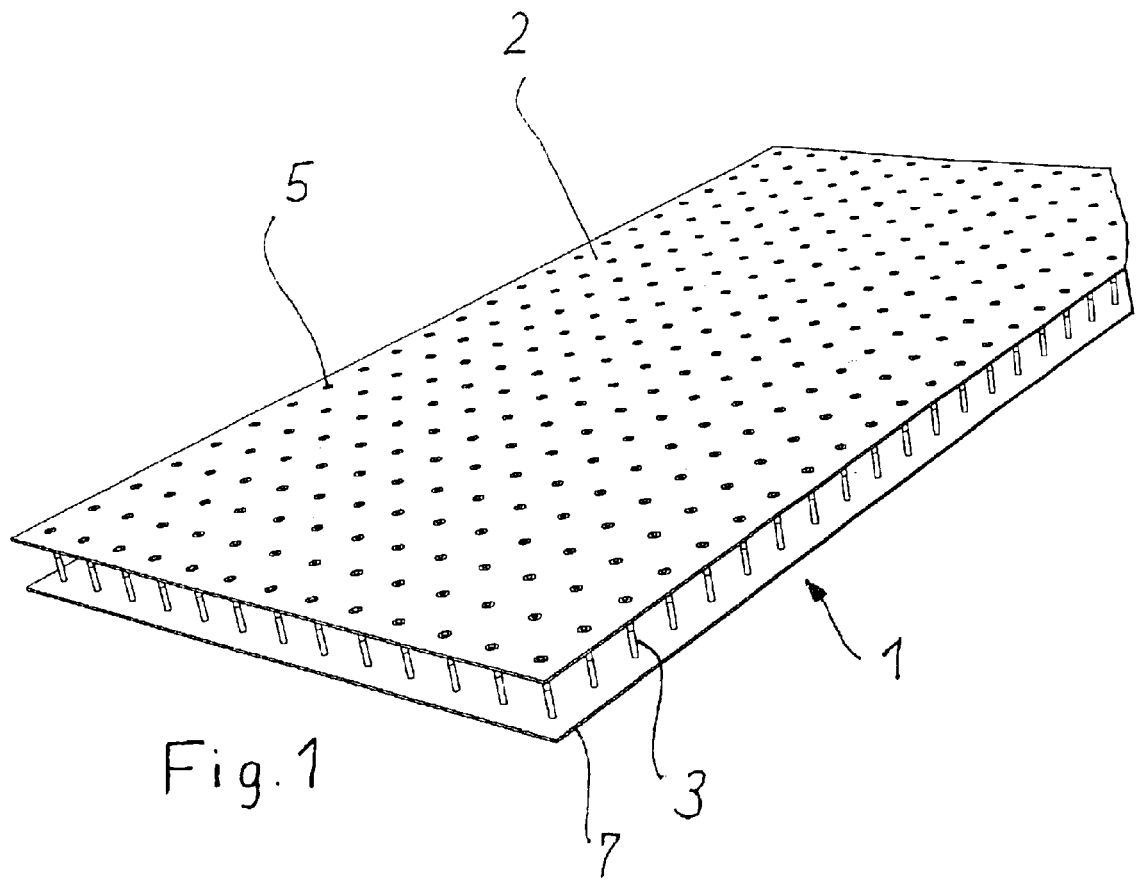
FIG. 1 is a perspective view of embodiment of the sandwich board according to the intention.

The sandwich board 1 illustrated in the drawing is comprised of an upper plate 2 which usually forms the clamping surface for erecting the workpiece clamping devices. For this purpose, fastening bores 5 are provided in the plate 2.

The support bodies are in the form of pegs or pins 3 which can be designed in many different ways.

Figure 2:
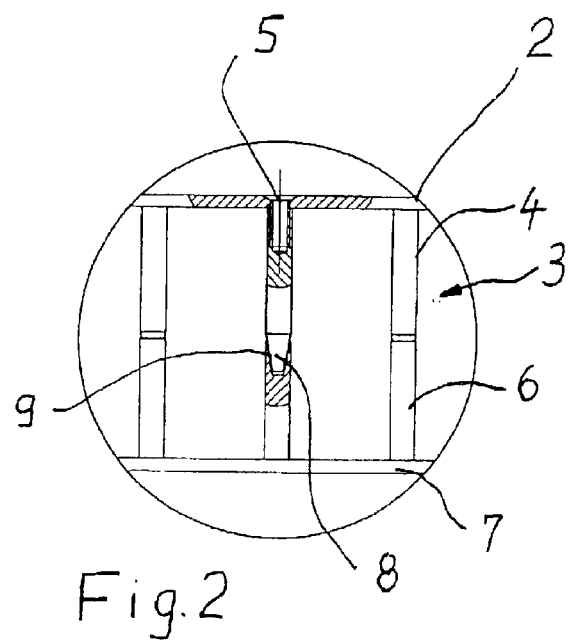
FIG. 2 is an enlarged detail view of the sandwich board of FIG. 1.

In the embodiment according to FIG. 2, each pin 3 is essentially divided so that two parts or pin sections 4 and 6 result. One part 4 has a conical end 8 which engages a complementary cone-shaped recess of the part 6. The conical end 8 is glued to the recess. The upper part 4 is connected by friction welding to the upper plate 2. The part 6 becomes a component of the lower plate 7 by being friction-welded to the lower plate 7.

This sandwich board according to FIGS. 1 and 2 is manufactured such that first the two parts 4, 6 are connected by friction welding to the corresponding plates 2 and 7, respectively. Subsequently, the parts 4, 6 are inserted into one another and connected by gluing. In this way, a sandwich board as illustrated in FIG. 1 is formed.

The fastening bore 5 is positioned advantageously on the axis of a pin-shaped support body 3 so that sufficient material and depth for an excellent attachment is available. Several such fastening bores 5 are provided, preferably arranged in rows, as illustrated. However, it is not mandatory that each peg or pin is provided with such a bore.

Figure 3:
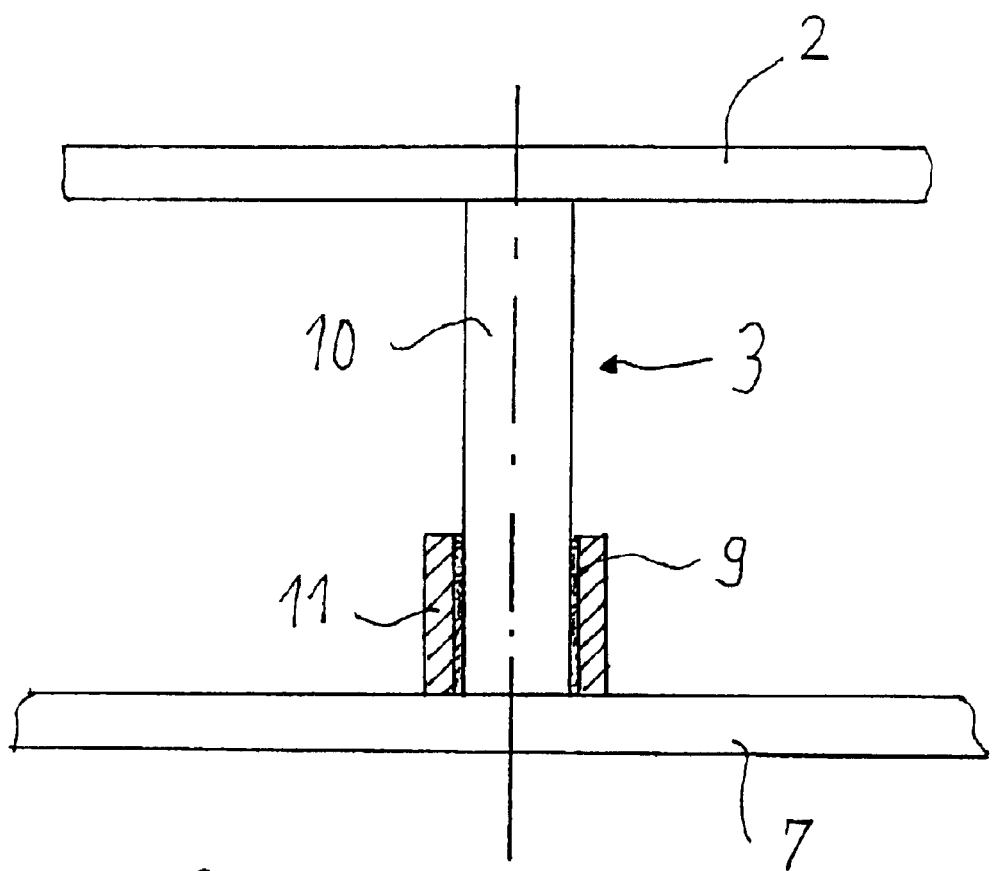
FIG. 3 is a detail of a sandwich board of a second embodiment according to the invention.

In the embodiment according to FIG. 3, the peg or pin 3 extends practically as a single or unitary part from the plate 2 to the plate 7. The attachment on the plate 7 is realized in that a sleeve 11 is attached thereto by friction welding. The pin section 10 is inserted into this sleeve 11 and glued thereto (at gluing location 9). The adhesive used for this purpose is preferably a two-component epoxy resin.

In the context of the present invention according to which a support body in the form of a pin, a peg, a rod or a similar element is used, the connection of this element, optionally in divided form, to the corresponding plate is realized by friction welding caused by a rotary movement of the pin about the pin axis. The parts of the support bodies (pins, pegs etc.) divided into sections or divided in other suitable ways are then glued together, i.e., at least one friction-welding connection and at least one glued connection are provided.

While specific embodiments of the invention have been shown and described in detail to illustrate the inventive principles, it will be understood that the invention may be embodied otherwise without departing from such principles.

What is claimed is:

1. A sandwich board for erecting workpiece clamping devices, the sandwich board comprising:

an upper plate forming a clamping surface and provided with fastening bores;

a lower plate forming a support surface;

support bodies positioned between the upper plate and the lower plate;

wherein the support bodies are pin-shaped and are friction-welded to a first one of the upper and lower plates and connected by a glued connection to a second one of the upper and lower plates, and wherein the support bodies are divided and comprise first pin sections friction-welded to the first one of the upper and lower plates and second pin sections friction-welded to the second one of the upper and lower plates, wherein ends of the first and second pin sections facing one another are glued together and form the glued connection, respectively.

2. The sandwich board according to claim 1, wherein the ends of the first pin sections are conical ends and the ends of the second pin sections are matching conical recesses, wherein the conical sections and the conical recesses are glued together and form the glued connection, respectively.

3. The sandwich board according to claim 1, wherein the ends of the first pin sections are conical recesses and the ends of the second pin sections are matching conical ends, wherein the conical sections and the conical recesses are glued together and form the glued connection, respectively.

4. The sandwich board according to claim 1, wherein the second one of the upper and lower plates comprises sleeves friction-welded to the second one of the upper and lower plates, wherein the sleeves are glued to the support bodies, respectively.

5. The sandwich board according to claim 1, wherein the upper and lower plates and the support bodies are made of aluminum or aluminum alloy.

* * * * *